(12) United States Patent
Shima

(10) Patent No.: US 12,081,919 B2
(45) Date of Patent: Sep. 3, 2024

(54) IMAGE PROCESSING APPARATUS AND IMAGING DEVICE

(71) Applicant: MAXELL FRONTIER CO., LTD., Kanagawa (JP)

(72) Inventor: Yuichiro Shima, Kanagawa (JP)

(73) Assignee: MAXELL FRONTIER CO., LTD., Kanagawa (JP)

( * ) Notice: Subject to any disclaimer, the term of this patent is extended or adjusted under 35 U.S.C. 154(b) by 817 days.

(21) Appl. No.: 16/973,792

(22) PCT Filed: Jun. 5, 2019

(86) PCT No.: PCT/JP2019/022290
§ 371 (c)(1),
(2) Date: Dec. 10, 2020

(87) PCT Pub. No.: WO2019/239978
PCT Pub. Date: Dec. 19, 2019

(65) Prior Publication Data
US 2021/0258552 A1   Aug. 19, 2021

(30) Foreign Application Priority Data

Jun. 12, 2018 (JP) ................................ 2018-112296

(51) Int. Cl.
*H04N 9/43* (2006.01)
*G06T 1/20* (2006.01)
(Continued)

(52) U.S. Cl.
CPC ................. *H04N 9/43* (2013.01); *G06T 1/20* (2013.01); *G06T 3/4015* (2013.01); *H04N 9/67* (2013.01); *H04N 23/12* (2023.01)

(58) Field of Classification Search
CPC ............ H04N 9/43; H04N 9/67; H04N 23/12; H04N 23/843; G06T 1/20; G06T 3/4015
See application file for complete search history.

(56) References Cited

U.S. PATENT DOCUMENTS 6,473,521 B1 * 10/2002 Hino ...................... G06K 15/02
382/164
2007/0236566 A1 * 10/2007 Chan ...................... H04N 3/127
348/E3.015
(Continued)

FOREIGN PATENT DOCUMENTS

JP   2006-033496 A   2/2006
JP   2012-222453 A   11/2012
(Continued)

OTHER PUBLICATIONS

International Search Report of PCT/JP2019/022290 dated Jul. 30, 2019.
(Continued)

*Primary Examiner* — Solomon G Bezuayehu
(74) *Attorney, Agent, or Firm* — Mattingly & Malur, PC

(57) ABSTRACT

An image processing apparatus 1 includes a pre-processor 10 and a main processor 30. The pre-processor 10 generates pre-processing data by performing a pre-processing of Bayer data outputted from an imaging device 91, and outputs the generated pre-processing data. The main processor 30 performs an image processing based on the pre-processing data.

22 Claims, 11 Drawing Sheets

(51) Int. Cl.
*G06T 3/4015* (2024.01)
*H04N 9/67* (2023.01)
*H04N 23/12* (2023.01)

(56) References Cited

U.S. PATENT DOCUMENTS

| | | | |
|---|---|---|---|
| 2008/0240561 A1* | 10/2008 | Kuwahara | H04N 1/4074 |
| | | | 382/168 |
| 2008/0317455 A1* | 12/2008 | Abe | G06V 40/174 |
| | | | 348/222.1 |
| 2010/0253779 A1* | 10/2010 | Itoh | G06V 20/52 |
| | | | 348/143 |
| 2012/0257074 A1 | 11/2012 | Fujimoto | |
| 2014/0078338 A1 | 3/2014 | Hatano | |
| 2014/0168472 A1 | 6/2014 | Sengoku et al. | |
| 2014/0172296 A1* | 6/2014 | Shtukater | G01C 21/3647 |
| | | | 701/408 |

FOREIGN PATENT DOCUMENTS

| | | |
|---|---|---|
| JP | 2014-072846 A | 4/2014 |
| JP | 2014-121024 A | 6/2014 |
| WO | 2012/169140 A1 | 12/2012 |
| WO | 2016/171006 A1 | 10/2016 |

OTHER PUBLICATIONS

Japanese Office Action received in corresponding Japanese Application No. 2018-112296 dated Apr. 27, 2021.

* cited by examiner

FIG. 3

SELECTION BIT

| | | | | |
|---|---|---|---|---|
| 1. | RGB 666 HIGH | R[7:2] | G[7:2] | B[7:2] |
| 2. | RGB 666 LOW | R[5:0] | G[5:0] | B[5:0] |
| 3. | RGB855 | R[7:0] | G[7:3] | B[7:3] |

FIG. 4
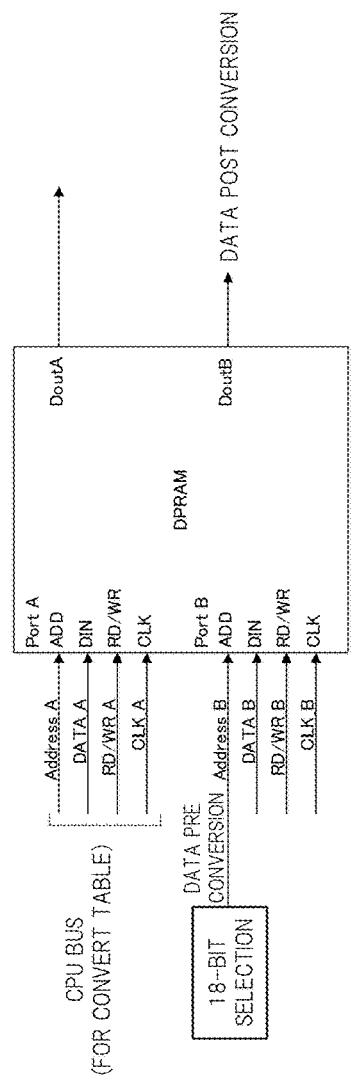
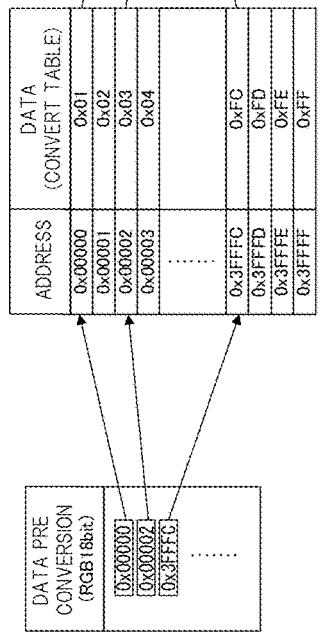
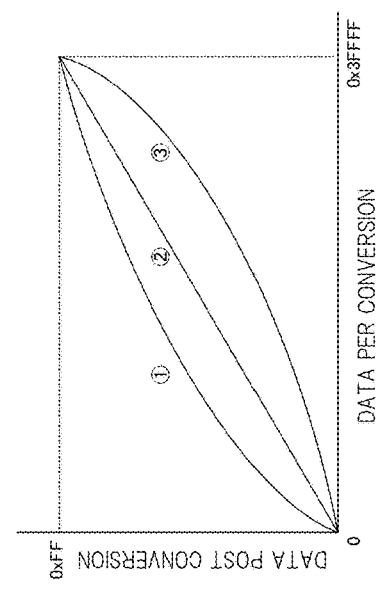

FIG. 6

1. 3×3 CONVOLUTION OPERATION SPEED-UP SUPPORT FORMAT

[PRE CONVERSION]

| 1 | 2 | 3 | 4 | 5 | 6 | 7 | 8 | 9 | 10 | 11 | 12 |
|---|---|---|---|---|---|---|---|---|---|---|---|
| 16 | 17 | 18 | 19 | 20 | 21 | 22 | 23 | 24 | 25 | 26 | 27 |
| 31 | 32 | 33 | 34 | 35 | 36 | 37 | 38 | 39 | 40 | 41 | 42 |
| 46 | 47 | 48 | 49 | 50 | 51 | 52 | 53 | 54 | 55 | 56 | 57 |
| 61 | 62 | 63 | 64 | 65 | 66 | 67 | 68 | 69 | 70 | 71 | 72 |
| 76 | 77 | 78 | 79 | 80 | 81 | 82 | 83 | 84 | 85 | 86 | 87 |

[POST CONVERSION]

| 1 | 16 | 31 | 2 | 17 | 32 | 3 | 18 | 33 | 4 | 19 | 34 | 5 | 20 | 35 | 6 | 21 | 36 | … | 10 | 25 | 40 | 11 | 26 | 41 | 12 | 27 | 42 |
|---|---|---|---|---|---|---|---|---|---|---|---|---|---|---|---|---|---|---|---|---|---|---|---|---|---|---|---|
| 46 | 61 | 76 | 47 | 62 | 77 | 48 | 63 | 78 | 49 | 64 | 79 | 50 | 65 | 80 | 51 | 66 | 81 | … | 55 | 70 | 85 | 56 | 71 | 86 | 57 | 72 | 87 |

2. BAYER DATA CONVERT SPEED-UP SUPPORT FORMAT

[PRE CONVERSION]

| 1G | 1R | 2G | 2R | 3G | 3R | 4G | 4R | 5G | 5R | 6G | 6R |
| 1B | 7G | 2B | 8G | 3B | 9G | 4B | 10G | 5B | 11G | 6B | 12G |
| 13G | 7R | 14G | 8R | 15G | 9R | 16G | 10R | 17G | 11R | 18G | 12R |

[POST CONVERSION]

| 1G | 1R | 2G | 1B | 7G | 2B | 13G | 7R | 14G | 2R | 3G | 8G | 3B | 9G | 8R | 15G | 9R | … | 5R | 6G | 6R | 11G | 6B | 12G | 12G | 11R | 18G | 12R |

FIG. 7
(a)
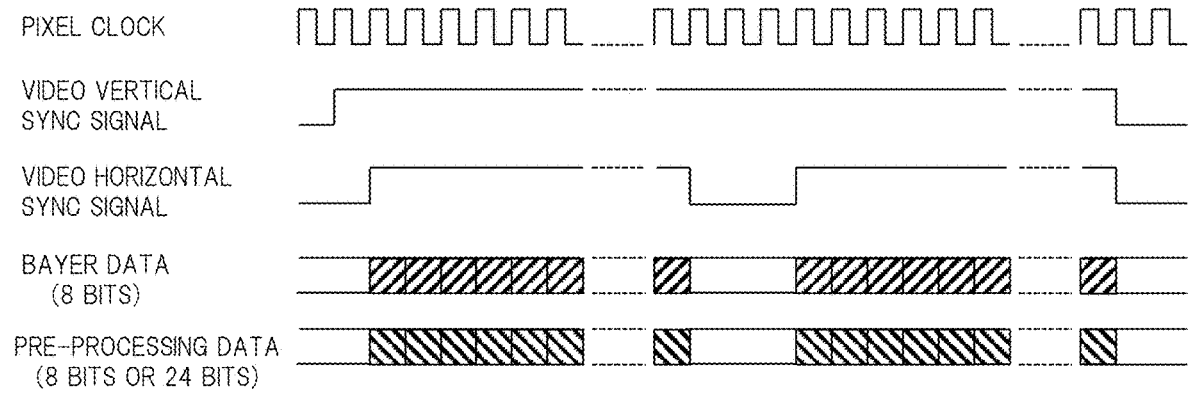
(b)
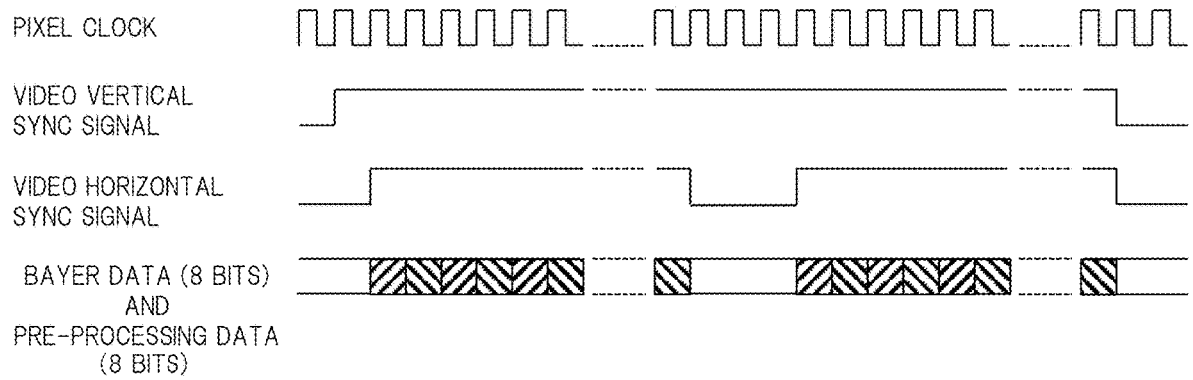

IMAGE PROCESSING APPARATUS AND IMAGING DEVICE

TECHNICAL FIELD

The present invention relates to an image processing apparatus and an imaging device.

BACKGROUND ART

An image processing apparatus generates image processing data by performing an image processing (s) on Bayer data that is transmitted from an imaging device. In such an image processing, for example, performed are respective processings of: (1) conversion from Bayer data to RGB data; (2) conversion from the RGB data to grayscale data; (3) conversion from the grayscale data to the image processing data; and the like.

Further, Patent Document 1 discloses that a RAW data compression processor has a data processing device including: a data divider that divides input data into a plurality of groups per the same kind of pieces of information data, the input data containing a plurality of kinds of pieces of information data formed by multiple bits; a maximum value extractor that extracts the maximum value of the information data in each group divided by the data divider; and a bit-reduction position determiner that determines a bit-reduction position (s) common to the same kind of pieces of information data in the group based on the maximum value extracted by the maximum value extractor and that reduces a common bit (s) depending on this determination. This makes it possible to suppress increases in processing time and circuit scale and simultaneously suppress deterioration of image quality.

RELATED ART DOCUMENTS

Patent Documents

Patent Document 1: JP 2012-222453 A

SUMMARY OF THE INVENTION

Problems to be Solved by the Invention

These image processings are mainly executed by a CPU (Central Processing Unit). However, a problem arises in that an interval of time required for the image processings becomes long since an inefficient processing such as frequent memory access is performed.

The present invention has been made in view of the above-mentioned problem in the conventional technique, and has an object of speeding up an image processing (s).

Means for Solving the Problems

The following is a brief description of an outline of the typical invention disclosed in the present application.

An image processing apparatus according to a typical embodiment of the present invention includes a pre-processor and a main processor provided to a subsequent state of the pre-processor. The pre-processor generates pre-processing data for performing a pre-processing of Bayer data outputted from an imaging device, and outputs the generated pre-processing data to the main processor. The main processor performs an image processing based on the pre-processing data.

Effects of the Invention

The effects obtained by typical embodiments of the invention disclosed in the present application will be briefly described below.

That is, according to the typical embodiment of the present invention, speeding up the image processing becomes possible.

BRIEF DESCRIPTION OF THE DRAWINGS

FIG. 3 is a view showing an example of selection bit in a bit selector;

FIG. 4 is a view showing a specific example of a configuration of a convert table;

FIG. 6 is a view showing the example of a data array convert;

FIG. 7 is a diagram for explaining an operation example of a data superimposer 20;

DETAILED DESCRIPTION OF PREFERRED EMBODIMENTS

Hereinafter, examples of embodiments of the present invention will be described with reference to the drawings. Incidentally, the embodiments described below are examples for realizing the present invention, and should be appropriately modified or changed depending on a configuration of an apparatus or device to which the present invention is applied and depending on various conditions. The present invention is not limited to the following embodiments. In addition, the present invention may be configured by appropriately combining a part of each embodiment described later.

First Embodiment

<Configuration of Image Processing Approach>

Figure 1:
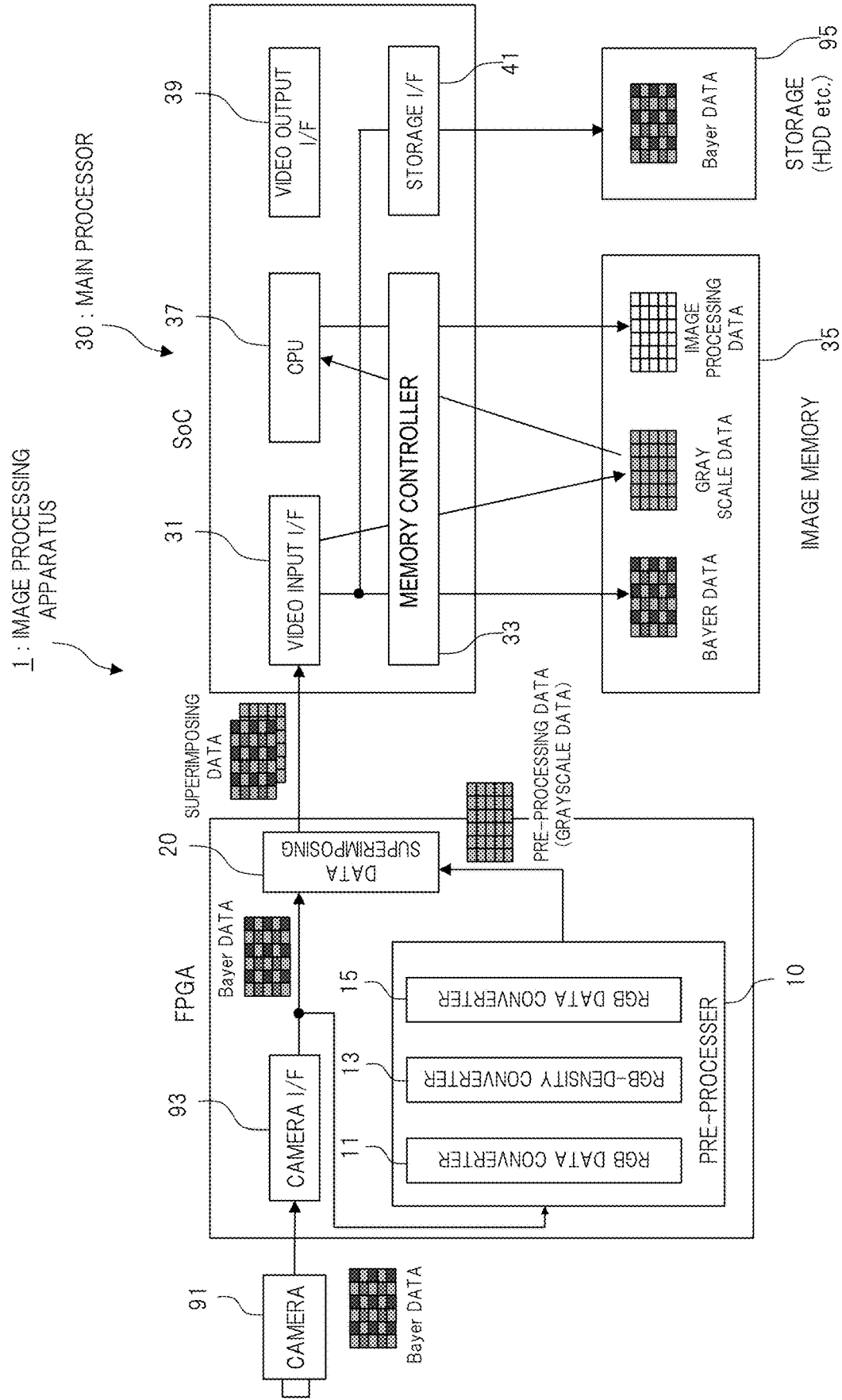
FIG. 1 is a view showing an example of a configuration of an image processing apparatus according to a first embodiment of the present invention.

FIG. 1 is a view showing an example of a configuration of an image processing apparatus according to a first embodiment of the present invention. As shown in FIG. 1, an image processing apparatus 1 includes a pre-processor 10, a data superimposer 20, and a main processor 30. Further, FIG. 1 also shows an imaging device (camera) 91, a camera interface (I/F) 93, and a storage 95. The camera interface 93 has an input end connected to the imaging device, and an output end connected to an input end of the pre-processor 10 and a first input end of the data superimposer 20.

The camera interface 93 inputs Bayer data outputted from the imaging device 91, and outputs the Bayer data to the pre-processor 10 and the data superimposer 20. The imaging device 91 outputs, for example, 8-bit Bayer data. In FIG. 1, for example, each functional block except the imaging device 91 is mounted on the same image processing board.

<<Pre-Processor>>

Figure 2:
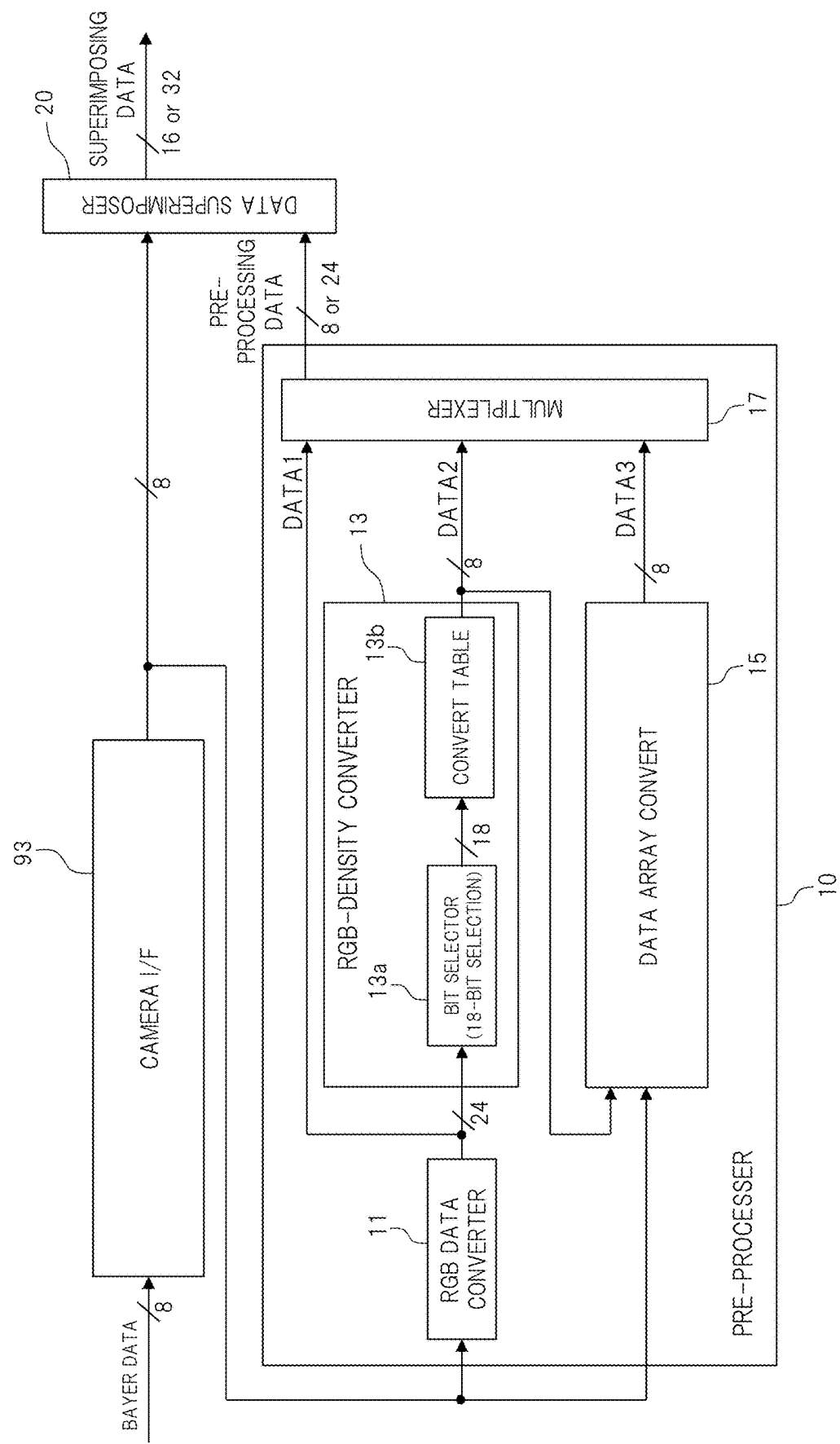
FIG. 2 is a view showing details of a configuration of a pre-processor.

FIG. 2 is a view showing details of a configuration of a pre-processor. The pre-processor 10 is a functional block that pre-processes Bayer data. As shown in FIG. 2, the pre-processor 10 includes an RGB data converter 11, an RGB-density converter 13, a data array converter 15, and a multiplexer 17. The pre-processor 10 is composed of, for example, an FPGA (field-programmable gate array). Further, the pre-processor 10 may be composed of the FPGA on the same substrate together with the camera interface 93 and the data superimposer 20 described later.

<<<RGB Data Converter>>>

An input end of the RGB data converter 11 is connected to an output end of the camera interface 93. Further, an output end of the RBG data converter 11 is connected to an input end of the RGB-density converter 13 and a first input end of the multiplexer 17. The RGB data converter 11 is a functional block that converts Bayer data into RGB data. The RGB data converter 11 converts, for example, the Bayer data into 24-bit (3 colors×8 bits) RGB data. The RGB data converter 11 outputs RGB data (DATA1) to the RGB-density converter 13 and the multiplexer 17.

<<<RGB-Density Converter>>>

The RGB-density converter 13 performs a processing of converting RGB data into grayscale data. An output end of the RGB-density converter 13 is connected to a second input end of the multiplexer 17 and a second input end of the data array converter 15. The RGB-density converter 13 is a functional block that converts RGB data into grayscale data by adjusting density of each RGB color and that outputs the generated grayscale data (DATA2) to the multiplexer 17. As shown in FIG. 2, the RGB-density converter 13 includes a bit selector 13a and a convert table (LUT) 13b. An input end of the bit selector 13a is connected to the output end of the RGB data converter. An output end of the bit selector 13a is connected to an input end of the convert table 13b. The output end of the convert table 13b is connected to an input end of the data array converter 15 and a second input end of the multiplexer 17.

The bit selector 13a is a functional block for generating selection bit data in which the predetermined number of bits from the RGB data is selected. The bit selector 13a generates selection bit data in which ratios of respective colors are different depending on a color of a subject to be photographed. For example, the bit selector 13a selects, as effective bits, 18 bits from 24-bit RGB data, and generates the selection bit data from the selected effective bits.

Specifically, if the subject needs to emphasize redness, the bit selector 13a increases the number of red (R) bits and decreases the number of green (G) and blue (G) bits other than them, thereby having only to select the bits so that the total number of bits becomes a predetermined number (e.g., 18 bits). The same applies also to a case where the subject needs to emphasize the other colors.

FIG. 3 is a view showing an example of a selection bit in the bit selector. FIG. 3 shows three examples. Cases 1 and 2 in FIG. 3 each show an example in which the number of bits of each color is 6 and is the same. First, R [7:2], G [7:2], and B [7:2] in high 6 bits of each color are selected in the example of case 1. In this example, a portion having a strong tint in each color is selected. Next, R [5:0], G [5:0], and B [5:0] in lower 6 bits of each color are selected in the example of case 2. In this example, a portion having a subdued tint in each color is selected.

Then, in the example of case 3, red (R) is the entire 8-bit R [7:0], and high 5-bit G [7:3] and B [7:3] of green (G) and blue (B) are selected, respectively. In this example, the bits of each color are selected so that the redness is emphasized. In this way, the number of bits of data in the subsequent processing is reduced, and an amount of data to be processed is reduced.

The convert table 13b converts the selected bit data, which has been generated by the bit selector 13a, into grayscale data having the number of bits less than a predetermined number. For example, the convert table 13b converts 18-bit selection bit data into 8-bit grayscale data. The convert table 13b is composed of, for example, a DPRAM (Dual Ported RAM) which is a kind of SRAM (Static Random Access Memory). Then, a LUT (Look up Table) is stored in the DPRAM. The LUT is a table for converting an address of the selection bit, which has been selected by the bit selector 13a, into predetermined data (grayscale data).

FIG. 4 is a view showing a specific example of a configuration of the convert table. FIG. 4 (a) is a view showing a specific example of input/output of the DPRAM. FIG. 4 (b) is a view showing a specific example of the LUT. FIG. 4 (c) is a view for comparing data pre conversion and data post conversion when pieces of convert data are different.

As shown in FIG. 4 (a), Port A and Port B are provided on an input side of the DPRAM. The Port A is connected to, for example, a CPU bus of a main processor described later and is used for setting and the like of convert data configuring the LUT. The Port B is connected to the bit selector 13a and is used for an input and the like of the selection bit data. Dout A and Dout B are provided on an output side of the DPRAM. The Dout B out of them outputs grayscale data converted by the LUT.

As shown in FIG. 4 (b), the LUT is a table in which an address of each bit of the RGB data and predetermined convert data set for each address are associated with each other. That is, assuming that the RGB data is 24 bits, twenty-four kinds of pieces of convert data are set in the LUT for each bit.

For example, as shown in FIG. 4 (b), if bits of addresses "0x000000", "0x00002", and "0x3FFFC" are selected, the respective addresses are converted into predetermined convert data "0x01", "0x03", and "0xFC". In this way, in the convert table 13b, the data is converted into data that has the small number of bits. Incidentally, the convert data is arbitrarily settable from the CPU. As shown in FIG. 4 (c), pieces of data post conversion differ depending on the convert data, but the number of bits of the data post conversion is the same (e.g., 8 bits).

Figure 5:
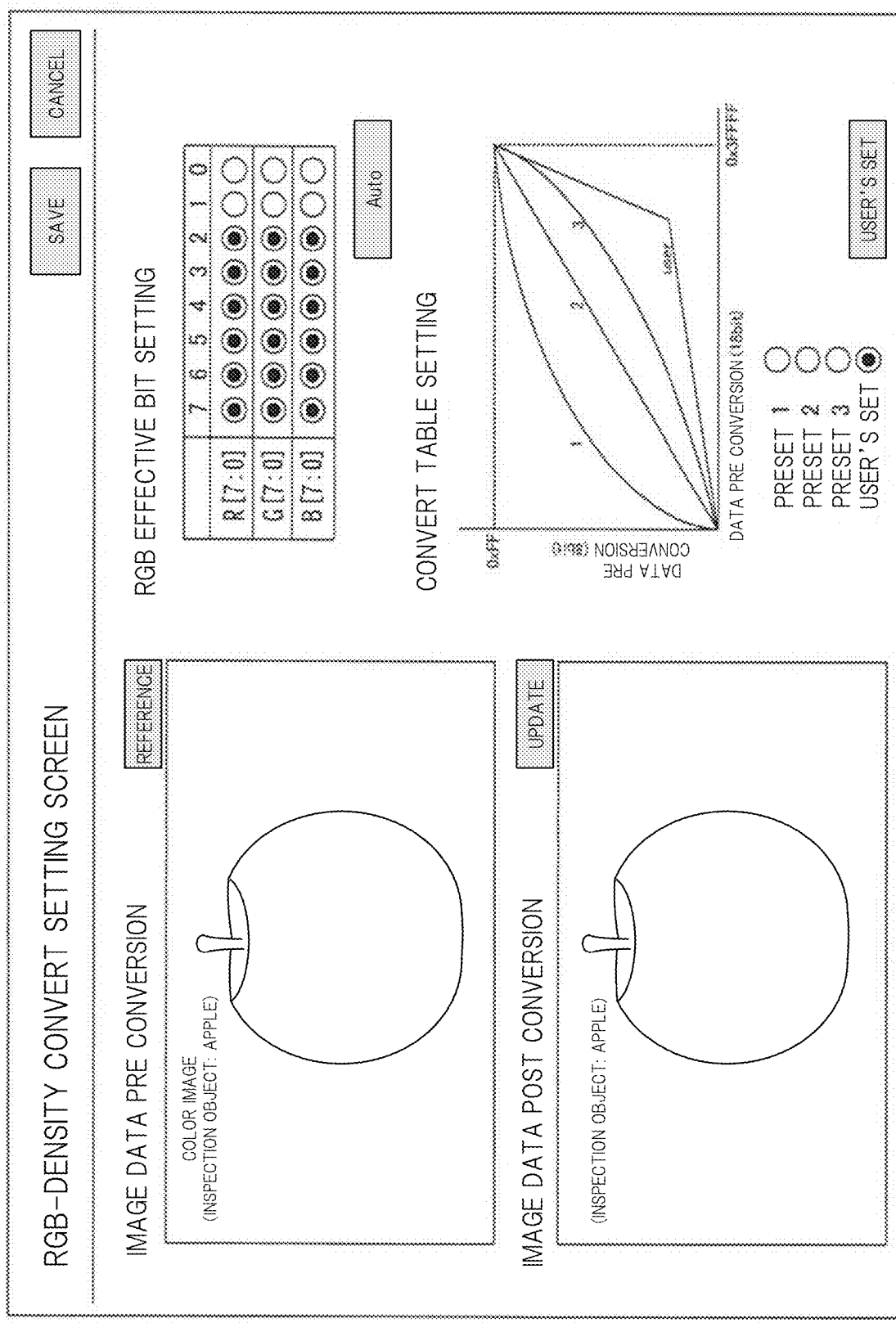
FIG. 5 is a view showing an example of an RGB-density convert setting screen.

FIG. 5 is a view showing an example of an RGB-density convert setting screen. This RGB-density convert setting screen is displayed on, for example, an external monitor (not shown) connected to an image output interface of the main processor described later.

Displayed on the RGB-density convert setting screen are, for example, an image data display area pre conversion, an image data display area post conversion, an RGB effective bit setting area, a convert table setting area, and the like.

In the RGB effective bit setting area, a bit selection screen of each color is displayed for selecting effective 18 bits from 24 bits. In the image data display area pre conversion, 24-bit image data before RGB-density convert is displayed. That is, in the image data display area pre conversion, image data for simulating the RGB-density convert is displayed. Since the image data displayed here is based on the RGB data, it is displayed in color. Incidentally, the image data can be selected with a reference button.

Meanwhile, in the image data display area post conversion, 8-bit image data after the RGB-density convert is displayed. That is, in the image data display area post conversion, the image data after RGB-density convert simulation based on the bits selected in the RGB effective bit setting area is displayed. The image data displayed here is grayscale display. Incidentally, the RGB-density convert is executed with an update button.

Displayed in the RGB effective bit setting area is a bit selection screen of each color for selecting effective 18 bits from 24 bits. When an Auto button is pressed, a color distribution of the image data pre conversion (e.g., 24 bits) is automatically analyzed and the optimum effective bit is selected based on an analysis result.

A convert table for the RGB-density convert is set in a convert table setting area. For example, if "Presets 1 to 3" are selected, the preset convert table is in a selection state and the RGB-density convert is executed based on the selected convert table. Meanwhile, if a "user set" is selected by a user setting button, the user's own convert table setting screen is displayed and the RGB-density convert is executed based on the convert table set by the user.

A save button and a cancel button are provided at an upper part of the RGB-density convert setting screen. When the save button is pressed, the effective bits and the convert table settings are saved. Further, after a saving processing is completed, the screen may transition to a high-order screen. These settings are not saved when the cancel button is pressed. Further, after a cancellation processing is completed, the screen may transition to the high-order screen.

<<<Data Array Converter>>>

As shown in FIG. 2, the first input end of the data array converter 15 is connected to the output end of the camera interface 93. The second input end of the data array converter 15 is connected to the output end of the convert table 13b. The output end of the data array converter 15 is connected to a third input end of the multiplexer 17.

The data array converter 15 is a functional block that converts data arrays of grayscale data and Bayer data to generate array convert data. For example, the data array converter 15 converts the grayscale data of a two-dimensional array into the array convert data of a one-dimensional array. Further, the data array converter 15 may convert the Bayer data of a two-dimensional array into the array convert data of a one-dimensional array. Incidentally, the data array converter 15 only converts an array of data such as grayscale data, and does not change the number of bits of the data before and after the data array convert. That is, for example, the 8-bit grayscale data or Bayer data before the conversion remains the 8-bit array convert data even after the conversion. The data array converter 15 outputs the converted the array convert data (DATA3) of one-dimensional array to the multiplexer 17.

FIG. 6 is a view showing an example of data array convert.

FIG. 6 shows examples of "3×3 convolution operation speed-up support format" and "Bayer data convert speed-up support format", respectively. In the "3×3 convolution operation speed-up support format", for example, grayscale data of a 3×3 two-dimensional array is converted into grayscale data (array convert data) of a 1×9 one-dimensional array.

Specifically, the 3×3 two-dimensional data on an upper left of data pre convert in FIG. 6 will be described as an example. Incidentally, each bit is numbered. The data array converter 15 first selects "1st", "16th", and "31st" bits in a left column, and sequentially arranges these pieces of bit data in a horizontal direction. Next, the data array converter 15 selects "2nd", "17th", and "32nd" bits in a middle column, and sequentially arranges these pieces of bit data after the "31st" bit data. Then, the data array converter 15 selects "3rd", "18th", and "33rd" bits in a right column, and sequentially arranges these pieces of bit data after the "32nd" bit data. In this way, the data array converter 15 converts the first 3×3 two-dimensional array data into the one-dimensional array data.

Then, the data array converter 15 sequentially selects 3×3 two-dimensional data, and sequentially arranges the bit data post conversion after the immediately preceding bit data. In this way, the data array converter 15 converts all of the 3×3 two-dimensional array data into the one-dimensional array data.

Next, the "Bayer data convert speed-up support format" will be described. In the "Bayer data convert speed-up support format", a data array of Bayer data is converted. In this way, the data array converter 15 may convert the data array of Bayer data. In the "3×3 convolution operation speed-up support format", the bit data has been converted into the one-dimensional array data for each column. However, in the "Bayer data convert speed-up support format", the bit data is converted into the one-dimensional array data for each row.

Specifically, the data array converter 15 selects "1G"-th, "1R"-th, and "2G"-th bits in an upper stage (first column), and sequentially arranges these pieces of bit data in the horizontal direction. Incidentally, the symbols added to the numbers indicate color of each bit. Next, the data array converter 15 selects "1B"-th, "7G"-th, and "2B"-th bits in a middle stage (second line), and sequentially arranges these pieces of bit data after the "2G"-th bit data. Then, the data array converter 15 selects "13G"-th, "7R"-th, and "14G"-th bits in a lower stage (third line), and sequentially arranges these pieces of bit data after the "2B"-th bit data. Since the following processings are the same, a description thereof will be omitted. Incidentally, the data array of Bayer data may be converted by the "3×3 convolution operation speed-up support format", or the data array of RGB data etc. may be converted by the "Bayer data convert speed-up support format".

Incidentally, FIG. 6 shows a case where the grayscale data of the 3×3 two-dimensional array is converted into the grayscale data of the 1×9 one-dimensional array, but the present embodiment is not limited to such a case. For example, grayscale data of a 5×5 two-dimensional array may be converted into grayscale data of a 1×25 one-dimensional array, or grayscale data of a two-dimensional array having a larger size than that of them may be converted into grayscale data of a one-dimensional array.

<<<Multiplexer>>>

The output end of the multiplexer 17 is connected to the second input end of the data superimposer 20. The multiplexer 17: inputs RGB data, grayscale data, and data array convert data; selects any one of these pieces of data; and outputs the selected data, as pre-processing data, to the data superimposer 20. FIG. 1 shows a case where grayscale data is selected and is outputted as pre-processing data.

In this way, the pre-processor 10 outputs the generated pre-processing data. Incidentally, for example, the multiplexer 17 may select data based on a signal outputted from the CPU, or may select data based on a user's instruction.

<<Data Superimposer>>

The data superimposer 20 is provided between the pre-processor 10 and the main processor 30. The output end of the data superimposer 20 is connected to the input end of the main processor 30. The data superimposer 20 and the main processor 30 are connected via, for example, a video bus. The data superimposer 20 generates superimposing data obtained by superimposing Bayer data and pre-processing data, and outputs the generated superimposing data to the main processor 30. FIG. 1 shows a case where Bayer data and grayscale data are superimposed.

For example, 8-bit Bayer data is inputted to the first input end of the data superimposer 20. Then, for example, 8-bit grayscale data, 8-bit array convert data, or 24-bit RGB data are inputted to the second input end of the data superimposer 20. Therefore, the data superimposer 20 outputs, for example, 16-bit superimposing data in which Bayer data and one of grayscale data or array convert data are superimposed. Alternatively, the data superimposer 20 outputs 32-bit superimposing data in which Bayer data and RGB data are superimposed.

FIG. 7 is a view illustrating an operational example of the data superimposer 20. FIG. 7 (a) is a view showing an operational example when Bayer data and pre-processing data are outputted in parallel. FIG. 7 (b) is a view showing an operational example when Bayer data and pre-processing data are outputted alternately. In FIG. 7 (a), a video bus width is, for example, 32 bits. In this case, since the data superimposer 20 can also deal with 32 bits which is the maximum number of bits of the superimposing data, it outputs the Bayer data and the pre-processing data in parallel. Specifically, the data superimposer 20 outputs the superimposing data in synchronization with a video sync signal (video horizontal sync signal).

Meanwhile, in FIG. 7 (b), the video bus width is, for example, 8 bits. In this case, since the data superimposer 20 cannot deal with 16 bits which is the minimum number of bits of the superposing data, it alternately outputs the Bayer data and the pre-processing data. Also in this case, the data superimposer 20 outputs the superimposing data in synchronization with the video horizontal sync signal.

In this way, the data superimposer 20 selects the data output format according to (depending on) the video bus width and the number of bits of the superimposing data.

<<Main Processor>>

As shown in FIG. 1, the main processor 30 includes a video input interface 31, a memory controller 33, an image memory 35, a CPU 37, a video output interface 39, and a storage interface 41. Among them, for example, the video input interface 31, memory controller 33, CPU 37, video output interface 39, and storage interface 41 excluding the image memory 35 are configured as a SoC (System on Chip) by one chip.

The video input interface 31 is connected to the data superimposer 20 via a video bus. The video input interface 31 inputs the superposing data outputted from the data superimposer 20 and outputs it to the memory controller 33. Incidentally, the video input interface 31 may perform a processing of separating the Bayer data and the pre-processing data from the superimposing data. In this case, the video input interface 31 may store the separated Bayer data in the image memory 35 via the memory controller 33, or may store it in a storage 95 of an external device via the storage interface 41.

The memory controller 33 is connected to functional blocks such as the video input interface 31, CPU 37, and image memory 35, and inputs and outputs various pieces of data between these functional blocks. For example, the memory controller 33 inputs the superposing data outputted from the video input interface 31, and separates the superposing data into Bayer data and pre-processing data (grayscale data in FIG. 1). Then, the memory controller 33 stores the separated Bayer data and pre-processing data in the image memory 35. Further, the memory controller 33 may store the Bayer data in the storage 95.

Further, the memory controller 33 reads, for example, grayscale data from the image memory 35 and outputs the grayscale data to the CPU 37 based on a request from the CPU 37. Furthermore, the memory controller 33 reads image processing data, which is generated by an image processing in the CPU 37, from the CPU 37 and stores it in the image memory 35. In addition, the memory controller 33 reads, for example, image processing data from the image memory and outputs it to an external device via the video output interface 39. This external device also includes, for example, a device that performs sorting work (inspection work) of inspection objects such as agricultural products like fruits and vegetables, etc. and industrial products etc. based on the image processing data.

The image memory 35 is a functional block for storing various pieces of data related to an image processing such as Bayer data, pre-processing data, and image processing data. The image memory 35 includes, for example, a volatile memory such as a DRAM (Dynamic RAM), and stores these pieces of data in the volatile memory.

Further, the CPU 37 controls each functional block of an image processing apparatus 1. In addition to this, the CPU 37 performs an image processing based on the pre-processing data generated by the pre-processor 10. In the example of FIG. 1, the CPU 37 performs an image processing based on grayscale data outputted as pre-processing data to generate image processing data. The generated image processing data is stored in the image memory 35. In this way, the CPU 37 performs the image processing by using the pre-processed data, which brings reduction in loads of the image processing.

In the present embodiment, the CPU 37 cannot perform the image processing on the same Bayer data until the pre-processing is completed. However, when imaging is continuously performed by an imaging device 91, for example, the pre-processor 10 can perform a pre-processing of the next Bayer data while the CPU 37 performs the image processing on the immediately preceding Bayer data. This makes it possible to speed up the image processing while reducing the load of the CPU 37.

The video output interface 39 is connected to, for example, an external device such as a not-shown display via a video bus. For example, data such as image processing data is outputted to an external device via the video output interface 39.

The storage interface 41 is connected to, for example, a storage 95 such as an HDD (Hard Disk Drive). For example, the Bayer data is outputted to the storage 95 via the storage interface 41.

Main Effects of Present Embodiment

According to the present embodiment, the CPU 37 performs the image processing based on the pre-processing data generated by the pre-processor 10. According to this configuration, the load of image processing in the CPU 37 is reduced, so that the image processing can be speeded up. Further, this leads to parallel execution of the image processing in the CPU 37 and the pre-processing of the next Bayer data, so that a plurality of image processings are efficiently performed.

Further, according to the present embodiment, the data array converter 15 converts the data array of Bayer data or grayscale data to generate array convert data. For example, the data array converter converts grayscale data arranged two-dimensionally in 3×3 into array convert data in a one-dimensional array of 1×9. According to this configuration, an access to the image memory 35 is made more efficient by converting the data array of grayscale data into a one-dimensional array. Further, this brings the reduction in loads of the image processing in the CPU 37, which leads to the speed-up of the image processing.

Further, according to the present embodiment, the multiplexer 17 selects any one of RGB data, grayscale data, and array convert data, and outputs the selected data as pre-processing data. According to this configuration, necessary data can be selected from a plurality of pieces of pre-processing data having different processing degrees, so that the image processing is performed more efficiently.

Further, according to the present embodiment, the bit selector 13a generates, for example, 18-bit selection bit data from 24-bit RGB data. According to this configuration, the circuit scales of the bit selector 13a and convert table 13b can be suppressed. In addition, a generation time of the selection bit data is shortened, and a time required for the pre-processing is shortened.

Further, since the bit selector 13a can select any 18 bits depending on the color of the subject, and so can perform RGB-density convert without deteriorating important color information. In addition, this bit selection makes it possible to reduce the number of bites of data in the subsequent processing (for example, RGB-shade convert processing), so that the amount of data to be processed is reduced and the processing speed can be increased, which further makes it possible to suppress the reduction or increase in the circuit scale of the convert table 13b.

Further, according to the present embodiment, the convert table 13b converts, for example, 18-bit selection bit data into 8-bit grayscale data. At that time, the convert table 13b refers to LUT and converts the address of the selection bit selected by the bit selector 13a into predetermined convert data. According to this configuration, the time required for the pre-processing is shortened.

Further, according to the present embodiment, the data superimposer 20 outputs the superimposing data, in which the Bayer data and the pre-processing data are superimposed, to the main processor. According to this configuration, the Bayer data pre conversion is also transferred to the main processor 30, so that raw data before the image processing is saved and the traceability request can also be handled.

Second Embodiment

Next, a second embodiment will be described. In the first embodiment, the grayscale data is outputted from the pre-processor 10. However, in the present embodiment, a case where the array convert data of the Bayer data is outputted as pre-processing data will be described.

Figure 8:
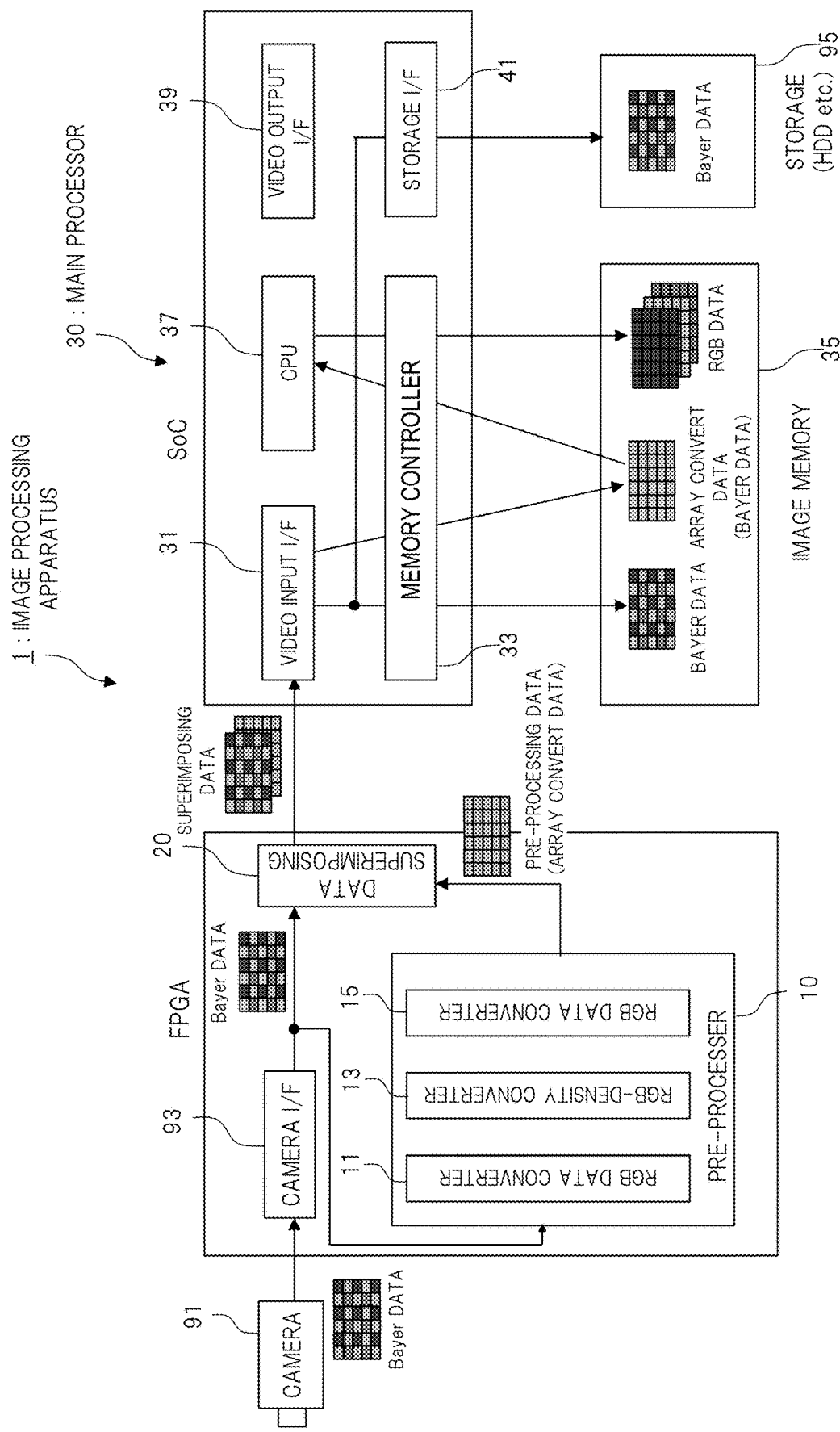
FIG. 8 is a view showing an example of a configuration of an image processing apparatus according to a second embodiment of the present invention.

FIG. 8 is a view showing an example of a configuration of the image processing apparatus according to the second embodiment of the present invention. FIG. 8 is similar to FIG. 1, but is different from FIG. 1 in that the array convert data of Bayer data is outputted. Further, in FIG. 8, the data stored in the image memory 35 is different from that in FIG. 1.

The data superimposer 20 superimposes the Bayer data and the array convert data of the Bayer data outputted from the multiplexer 17, and outputs the superimposing data to the main processor 30. In this way, the Bayer data and the array convert data of the Bayer data are stored in the image memory 35.

The CPU 37 generates RGB data based on the array convert data of the Bayer data. Then, the CPU 37 performs an image processing by sequentially generating the grayscale data and the image processing data based on, for example, RGB data.

As described above, when the CPU 37 has a margin of performance or when the CPU 37 also wants to generate RGB data, the image processing may be performed based on the array convert data of the Bayer data. By using the array convert data of the Bayer data, a load (s) on the CPU 37 is reduced, so that the image processing is speeded up. Further, the present embodiment can also obtain respective effects in the first embodiment that has been already described.

Third Embodiment

Next, a third embodiment will be described. In this embodiment, a method of automatically selecting effective bits in RGB-density convert will be described. Such automatic selection of effective bits is preferably used, for example, when continuously sorting work is performed to inspection objects such as a plurality of agricultural products different in product type.

Figure 9:
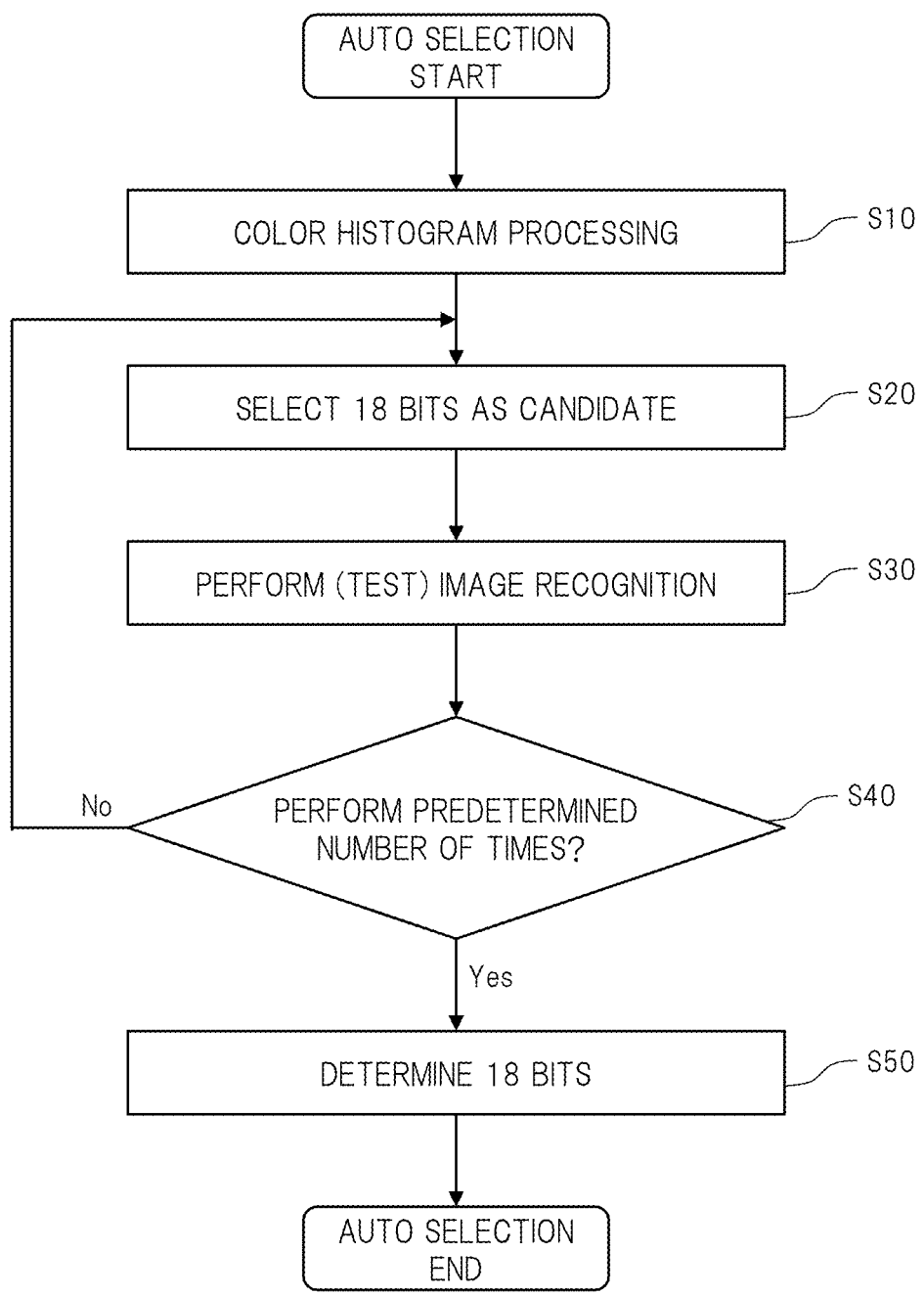
FIG. 9 is a flowchart showing an example of an effective-bit automatic selection method according to a third embodiment of the present invention.

An Auto button is provided in the RGB effective bit setting area on the density convert setting screen of FIG. 5. When this button is pressed, an effective bit (s) is automatically selected. FIG. 9 is a flowchart showing an example of an automatic selection method of effective bits according to a third embodiment of the present invention. For the automatic selection of the effective bit, for example, processings of steps S10 to S50 shown in FIG. 9 are performed.

First, in step S10, a color histogram processing is performed. Specifically, appearance frequency and a density distribution of each RGB color in image data (for example, RGB data) pre conversion are analyzed. Then, in step S20, 18 bits that are candidates for effective bits are selected based on an analysis result in step S10. Next, in step S30, image recognition is performed based on the 18 bits selected in step S20. Then, in step S40, it is determined whether or not the processings of steps S20 to S30 have been executed a predetermined number of times.

If the above processings have not reached the predetermined number of times (No), the next candidate 18 bits are selected while step 40 returns to step S20 to fine-tune the selection bits, and the image recognition is performed in step S30. Incidentally, image recognition results for the predetermined number of times are held so as to be capable of reference. Then, when the above processings reach the predetermined number of times (Yes), S40 proceeds to step S50. Then, in step S50, the optimum 18 bits are determined based on the image recognition result for each time.

Incidentally, the determined 18 bits are reflected in real time, and the convert table 13b outputs convert data corresponding to the reflected 18 bits.

Figure 10:
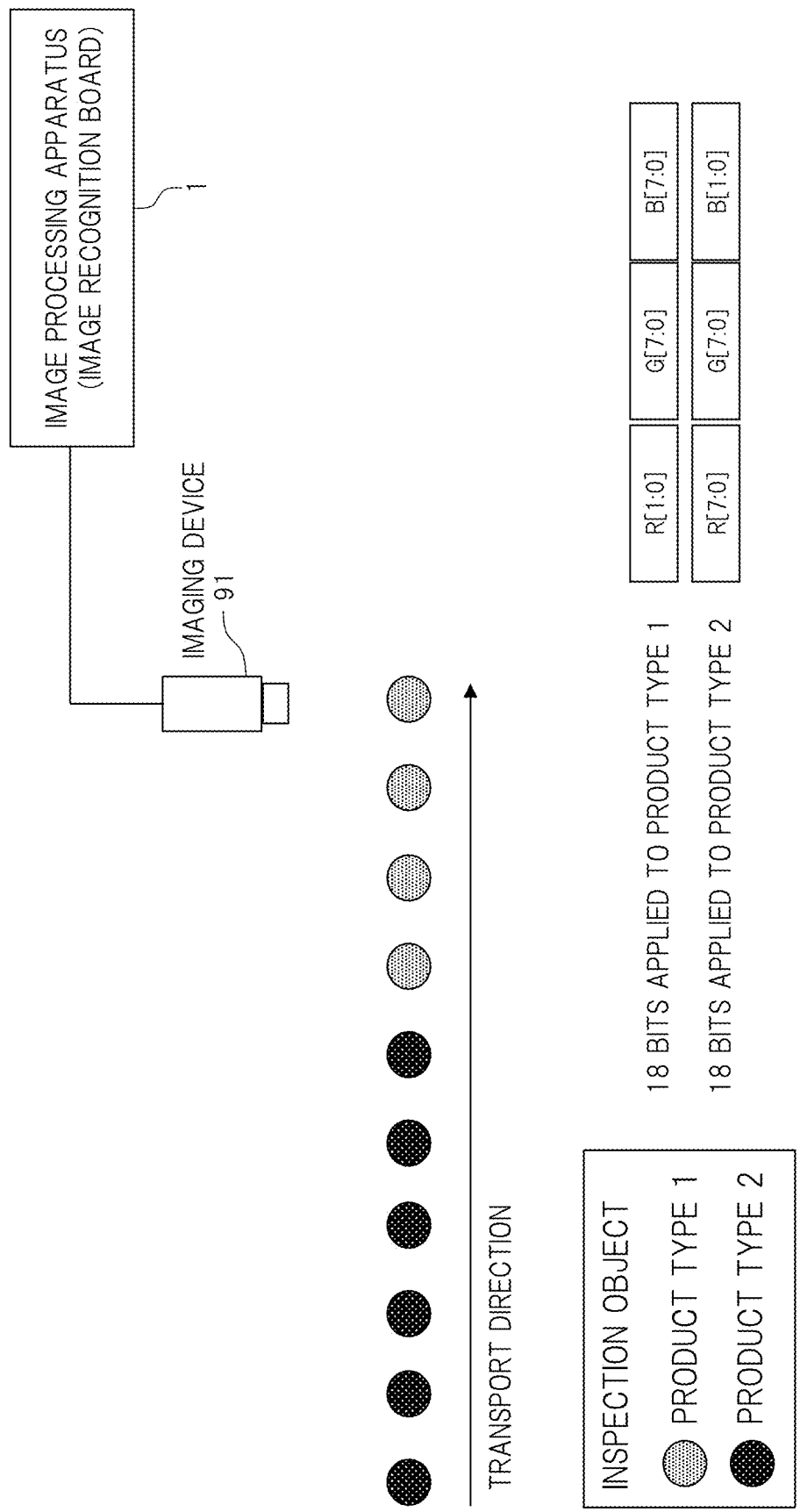
FIG. 10 is a view showing an example of automatic selection of an effective bit.

FIG. 10 is a view showing an example of automatic selection of effective bits. In FIG. 10, an inspection target of a product type 1 and an inspection target of a product type 2 are continuously transported in a predetermined transport direction. For example, color of the product type 1 is strongly green, and color of the product type 2 is strongly red.

In this case, for the product type 1, for example, 18 bits of R [1:0], G [7:0], and B [7:0] are selected. Further, for the product type 2, for example, 18 bits of R [7:0], G [7:0], and B [1:0] are selected. These selection bits are just an example, and may be affected also by the environment of inspection site such as lighting.

In the image processing apparatus 1, the selection bit is switched for each product type or for each inspection object. Consequently, sorting work for different product types (varieties) is continuously performed without stopping a transport device.

Also in the present embodiment, the same effects as those of the previous respective embodiments can be obtained.

Fourth Embodiment

Figure 11:
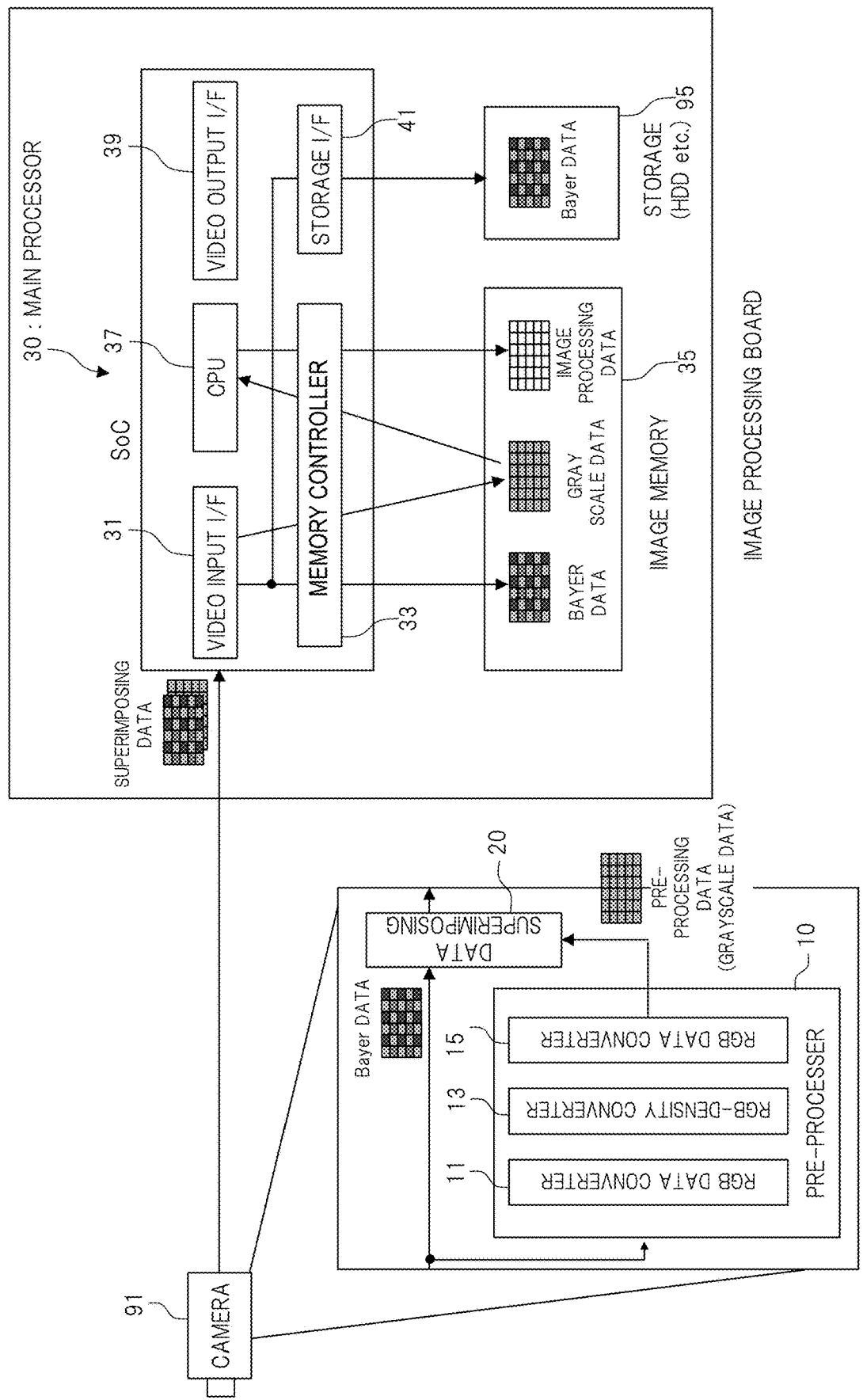
FIG. 11 is a view showing an example of a configuration of an imaging device according to a fourth embodiment of the present invention.

Next, a fourth embodiment will be described. In the present embodiment, an imaging device incorporating a pre-processor will be described. FIG. 11 is a view showing an example of a configuration of an imaging device according to a fourth embodiment of the present invention. As shown in FIG. 11, an imaging device 91 includes a pre-processor 10. Specifically, the imaging device 91 includes a data superimposer 20 as well as the pre-processor 10. Consequently, the imaging device 91 outputs the superimposing data, in which Bayer data and pre-processing data are superimposed, to the main processor 30. Incidentally, in the present embodiment, the camera interfaces 93 shown in FIGS. 1 and 8 are unnecessary.

In the present embodiment, the Bayer data can be stored in an internal memory of the imaging device 91. Therefore, after only the imaging is performed in advance and the imaging device 91 and the main processor 30 are connected, the image processing may be performed. Also in the present embodiment, the same effects as those of the previous respective embodiments can be obtained.

In each embodiment, each of the above functional blocks may be composed of circuits or software. Further, some functional blocks may be configured by a circuit, and other functional blocks may be configured by software. Furthermore, a part or all of each functional block is configured by an integrated circuit such as a CPU or FPGA, and a program (s) stored in an internal or external memory of the CPU or FPGA may be read out, thereby executing an operation of each functional block.

Incidentally, the present invention is not limited to the above-described embodiments, and includes various modifications. For example, the above-described embodiments have been described in detail in order to explain the present invention in an easy-to-understand manner, and so is not necessarily limited to the one including all the described configurations.

In addition, it is possible to replace a part of a configuration of one embodiment with a configuration of another embodiment, and it is also possible to add the configuration of another embodiment to the configuration of one embodiment. Further, it is possible to add, delete, or replace a part of a configuration of each embodiment to, from, or with another configuration.

For example, when the data array convert is not performed in the pre-processor, the data array converter may be deleted. In this case, the pre-processor 10 outputs RGB data or grayscale data as pre-processing data.

Incidentally, each member and its relative size described in the drawings are simplified and idealized in order to explain the present invention in an easy-to-understand manner, and may have a more complicated shape in mounting.

EXPLANATION OF REFERENCE NUMERALS

1 . . . Image processing apparatus; 10 . . . Pre-processor; 11 . . . RGB data converter; 13 . . . RGB-density converter; 15 . . . Data array converter; 17 . . . Multiplexer; 20 . . . Data superimposer; 30 . . . Main processor; 33 . . . Memory controller; 35 . . . Image memory; 37 . . . CPU; and 91 . . . Imaging device.

The invention claimed is:

1. An image processing system comprising:
an imaging device;
a pre-processor generating pre-processing data based on Bayer data inputted from the imaging device; and
a main processor inputting the pre-processing data generated by the pre-processor, and performing an image processing based on the pre-processing data, wherein the pre-processor comprises:
  a camera interface inputting the Bayer data from the imaging device;
  an RGB data converter generating RGB data based on the Bayer data;
  an RGB-density converter generating grayscale data by adjusting a density of each color based on the RGB data;
  a data array converter generating array convert data based on the Bayer data or the grayscale data; and
  a data superimposer superimposing one or more of the RGB data, the grayscale data, and the array convert data on the Bayer data to output it as the pre-processing data, and
wherein the main processor separates the pre-processing data into the Bayer data and the one or more of the RGB data, the grayscale data, and the array convert data to perform an image processing.

2. The image processing system according to claim 1, wherein the main processor comprises:
  a video input interface inputting the pre-processing data from the pre-processor, and separating the pre-processing data into the Bayer data and the one or more of the RGB data, the grayscale data, and the array convert data;
  an image memory storing image data;
  a memory controller controlling an input/output of the image data with respect to the image memory;
  a video output interface for outputting the image data to an external device;
  a storage interface outputting the pre-processing data to an external storage;
  a CPU controlling the video input interface, the memory controller, the video output interface, and the storage interface to perform the image processing.

3. The image processing system according to claim 2, wherein the video input interface, the memory controller, the video output interface, the storage interface, and the CPU are configured as one chip of a SoC (System on Chip).

4. The image processing system according to claim 1, wherein the pre-processor has a multiplexer that inputs the RGB data, the grayscale data, and the array convert data, and the multiplexer selects any one of the RGB data, the grayscale data, and the array convert data, and outputs the selected one of the RGB data, the grayscale data, and the array convert data to the data superimposer.

5. The image processing system according to claim 1, wherein the RGB-density converter has: a bit selector that selects the predetermined number of bits from the RGB data and generates selection bit data composed of the selected bits; and a convert table that converts the selection bit data into the grayscale data having the number of bits less than the predetermined number.

6. The image processing system according to claim 5, wherein the bit selector generates the selection bit data of 18 bits from the RGB data of 24 bits, and
the convert table converts the grayscale data of 18 bits into the selection bit data of 8 bits.

7. The image processing system according to claim 5, wherein the convert table has a LUT (Look Up Table) that associates an address of the selection bit selected by the bit selector with predetermined convert data.

8. The image processing system according to claim 5, wherein the bit selector generates the selection bit data in which each ratio of color is different depending on color of a subject.

9. The image processing system according to claim 1, wherein the data array converter converts the grayscale data of a two-dimensional array into the array convert data of a one-dimensional array.

10. The image processing system according to claim 9, wherein the data array converter converts the grayscale data of the two-dimensional array with 3×3 into the array convert data of the one-dimensional array with 1×9.

11. An image processing apparatus comprising:
a pre-processor generating pre-processing data based on inputted Bayer data; and
a main processor inputting the pre-processing data generated by the pre-processor, and performing an image processing based on the pre-processing data;
wherein the pre-processor comprises:
 a camera interface inputting the Bayer data;
 an RGB data converter generating RGB data based on the Bayer data;
 an RGB-density converter generating grayscale data by adjusting a density of each color based on the RGB data;
 a data array converter generating array convert data based on the Bayer data or the grayscale data; and
 a data superimposer superimposing one or more of the RGB data, the grayscale data, the array convert data on the Bayer data to output it as the pre-processing data, and
the main processor separates the pre-processing data into the Bayer data and the one or more of the RGB data, the grayscale data, and the array convert data to perform the image processing.

12. The image processing apparatus according to claim 11,
wherein the main processor comprises:
 a video input interface inputting the pre-processing data from the pre-processor, and separating the pre-processing data into the Bayer data and the one or more of the RGB data, the grayscale data, and the array convert data;
 an image memory storing image data;
 a memory controller controlling an input/output of the image data with respect to the image memory;
 a video output interface for outputting the image data to an external device;
 a storage interface outputting the pre-processing data to an external storage; and
 a CPU controlling the video input interface, the memory controller, the video output interface, and the storage interface to perform the image processing.

13. The image processing apparatus according to claim 12,
wherein the video input interface, the memory controller, the video output interface, the storage interface, and the CPU are configured as one chip of a SoC (System on Chip).

14. The image processing apparatus according to claim 13,
wherein the pre-processor has a multiplexer that inputs the RGB data, the grayscale data, and the array convert data, and
the multiplexer selects any one of the RGB data, the grayscale data, and the array convert data, and outputs the selected data.

15. The image processing apparatus according to claim 12,
wherein the RGB-density converter has: a bit selector that selects the predetermined number of bits from the RGB data and generates selection bit data composed of the selected bits; and a convert table that converts the selection bit data into the grayscale data having the number of bits less than the predetermined number.

16. The image processing apparatus according to claim 15,
wherein the bit selector generates the selection bit data of 18 bits from the RGB data of 24 bits, and
the convert table converts the grayscale data of 18 bits into the selection bit data of 8 bits.

17. The image processing apparatus according to claim 15,
wherein the convert table has a LUT (Look Up Table) that associates an address of the selection bit selected by the bit selector with predetermined convert data.

18. The image processing apparatus according to claim 15,
wherein the bit selector generates the selection bit data in which each ratio of color is different depending on color of a subject.

19. The image processing apparatus according to claim 13,
wherein the data array converter converts the grayscale data of a two-dimensional array into the array convert data of a one-dimensional array.

20. The image processing apparatus according to claim 19,
wherein the data array converter converts the grayscale data of the two-dimensional array with 3×3 into the array convert data of the one-dimensional array with 1×9.

21. A pre-processing method of an image processing apparatus configured by: a pre-processor generating pre-processing data based on inputted Bayer data; and a main processor inputting the pre-processing data generated by the pre-processor and performing an image processing based on the pre-processing data, the pre-processing method comprising:

the pre-processor performing the steps of:
  inputting Bayer data;
  performing any one of three steps of:
    generating RGB data based on the Bayer data;
    generating grayscale data by adjusting a density of each color based on the RGB data; and
    generating array convert data based on the Bayer data or the grayscale data;
  superimposing one or more of the RGB data, the grayscale data, and the array convert data on the Bayer data to output it to the main processor as the pre-processing data; and
the main processor performing the steps of:
  separating the pre-processing data inputted from the pre-processor into the Bayer data and the one or more of the RGB data, the grayscale data, and the array convert data; and
  performing an image processing.

22. The image processing method according to claim 21, further comprising the step of photographing an image by an imaging device and generating the Bayer data.

* * * * *